US010081414B2

(12) United States Patent
Le Devehat et al.

(10) Patent No.: US 10,081,414 B2
(45) Date of Patent: Sep. 25, 2018

(54) CONTROL DEVICE FOR FLUID LOADING AND/OR UNLOADING SYSTEM

(75) Inventors: Renaud Le Devehat, Thorigny-sur-Oreuse (FR); Nicolas Sylard, Auxerre (FR)

(73) Assignee: FMC Technologies, S.A., Sens (FR)

( * ) Notice: Subject to any disclaimer, the term of this patent is extended or adjusted under 35 U.S.C. 154(b) by 692 days.

(21) Appl. No.: 12/736,789

(22) PCT Filed: Jun. 23, 2008

(86) PCT No.: PCT/IB2008/002685
§ 371 (c)(1),
(2), (4) Date: Nov. 8, 2010

(87) PCT Pub. No.: WO2009/141675
PCT Pub. Date: Nov. 26, 2009

(65) Prior Publication Data

US 2011/0066290 A1 Mar. 17, 2011

(30) Foreign Application Priority Data

May 22, 2008 (FR) ...................................... 08 53349

(51) Int. Cl.

| | |
|---|---|
| ***G05B 19/18*** | (2006.01) |
| ***B63B 27/24*** | (2006.01) |
| ***B67D 9/02*** | (2010.01) |
| ***B63B 27/34*** | (2006.01) |

(52) U.S. Cl.
CPC .............. *B63B 27/24* (2013.01); *B63B 27/34* (2013.01); *B67D 9/02* (2013.01)

(58) Field of Classification Search
CPC .......... B67D 9/02; F16L 1/19; G01N 35/0099
USPC ........... 137/615, 798; 414/1, 137.1; 700/279
See application file for complete search history.

(56) References Cited

U.S. PATENT DOCUMENTS

| | | | | |
|---|---|---|---|---|
| 4,205,308 | A | 5/1980 | Haley et al. | |
| 4,402,350 | A | 9/1983 | Ehret et al. | |
| 4,408,943 | A | 10/1983 | McTamaney et al. | |
| 4,758,970 | A | 7/1988 | Keary et al. | |
| 6,114,975 | A * | 9/2000 | Guillard | 340/945 |

(Continued)

FOREIGN PATENT DOCUMENTS

| | | |
|---|---|---|
| CN | 1570796 A | 1/2005 |
| GB | 880699 | 10/1961 |

(Continued)

*Primary Examiner* — Darrin D Dunn

(57) ABSTRACT

A control device for controlling the movement of a coupling located on the movable end of a fluid transfer line of a marine loading system includes at least three actuators which each control movement of the coupling in a corresponding degree of freedom, a device positioned on or adjacent the coupling and/or a target duct for providing information on the positioning of the coupling, and a calculating device for (a) calculating the positioning of the coupling relative to the target duct on the basis of the positioning information, (b) calculating control instructions for each of the actuators which will result in movement of the coupling toward the target duct, (c) applying the control instructions to the actuators to bring the coupling toward the target duct, and (d) repeating steps (a)-(c) as necessary until the coupling is located in a position for connection to the target duct.

13 Claims, 6 Drawing Sheets

(56) References Cited

U.S. PATENT DOCUMENTS

| | | | | |
|---|---|---|---|---|
| 6,317,953 | B1 * | 11/2001 | Pryor | 29/407.04 |
| 7,469,863 | B1 * | 12/2008 | Speer | 244/135 A |
| 8,181,662 | B2 * | 5/2012 | Pollack et al. | 137/15.08 |
| 2002/0103596 | A1 * | 8/2002 | Zhu et al. | 701/115 |
| 2002/0117609 | A1 * | 8/2002 | Thibault et al. | 250/231.14 |
| 2003/0025039 | A1 * | 2/2003 | Fischer | 244/155 R |
| 2003/0195676 | A1 * | 10/2003 | Kelly et al. | 701/29 |
| 2004/0089735 | A1 * | 5/2004 | Drechsel | 239/195 |
| 2004/0099336 | A1 * | 5/2004 | Le Devehat | 141/387 |
| 2004/0102876 | A1 * | 5/2004 | Doane | 701/9 |
| 2005/0014499 | A1 * | 1/2005 | Knoblach et al. | 455/431 |
| 2008/0109108 | A1 * | 5/2008 | Lawson | 700/213 |

FOREIGN PATENT DOCUMENTS

| | | | |
|---|---|---|---|
| GB | 2 008 287 | A | 5/1979 |
| GB | 2 030 654 | A | 4/1980 |
| GB | 2 184 090 | A | 6/1987 |
| JP | 53-51875 | A | 5/1978 |
| JP | 63-76700 | U | 5/1988 |
| JP | 2888325 | B2 | 5/1999 |
| JP | 2003-276677 | A | 10/2003 |
| JP | 2005-096585 | A | 4/2005 |
| WO | WO 2004094296 | A1 * | 11/2004 |

* cited by examiner

CONTROL DEVICE FOR FLUID LOADING AND/OR UNLOADING SYSTEM

BACKGROUND OF THE INVENTION

The present invention generally relates to systems for loading and/or unloading fluids for ships, commonly referred to as marine loading systems. These systems are used to transfer a fluid product between a ship and a quay or between two ships.

Fluid product is understood to mean a liquid or gaseous product.

More particularly, the present invention concerns the devices for controlling movement, positioning and connection of such loading and/or unloading systems.

Generally, marine loading systems have a fluid transfer line end that is fixed to a base and connected to a tank of fluid to be transferred, and an opposite line end that is moveable and provided with a coupling adapted for connecting to a target duct, itself connected to a fluid tank.

Two families of fluid loading systems for ships are known, which are distinguished by their structure: systems for transfer by rigid pipes and systems for transfer by flexible pipes.

In the family of systems for transfer by rigid pipes, loading arm systems and pantograph systems can be distinguished.

The loading arm is an articulated tubing arrangement, comprising a base, connected to fluid tank, on which there is mounted a first pipe, designated inner pipe, via a portion of tube with a 90° bend enabling rotation of one of its ends about a vertical axis, and the other end about a horizontal axis. At the opposite end of the inner tube, a second pipe, designated outer pipe, is rotatably mounted about a horizontal axis. A coupling is mounted at the end of the outer pipe. Each of the three rotations is controlled by a jack or hydraulic motor.

The pantograph systems, like the loading arms, comprise a base connected to a tank. A crane is rotatably mounted on that base. The crane comprises a boom carrying a pipe for the fluid. At the end of the boom there is mounted a pantograph composed of articulated pipes for the fluid, and enabling a coupling to be moved that is mounted at the free end of the pantograph. The inclination of the pantograph is controlled by a rotation at the end of the boom. The movement of the pantograph is controlled by hydraulic motors and by a jack for the rotation on the base.

Lastly, the flexible piping systems generally comprise a line in which is conveyed the fluid product and a mechanical system enabling the line to be maneuvered. There are several types of maneuvering systems, but in all cases they include a manipulating crane or structure which supports the coupling for connecting the flexible piping.

In general, the loading system comprises an actuator at its end enabling the coupling to be clamped or unclamped. In general, this is one or more jacks or one or more hydraulic motors.

In practice, in most systems, the coupling is articulated at its end with three degrees of rotational freedom. In this way an angular orientation of the plane of the coupling relative to the plane of the target duct is possible independently of the inclination of the arm, the plane of the coupling remains parallel to the plane of the target duct on approach for the connection, and then, once the coupling has been clamped onto the target duct, these articulations enable a "floating" movement of the assembly. In practice, the rotations are controlled by the operator via hydraulic motors or jacks until connection has of the coupling to the target duct been achieved. Once the coupling has been clamped the hydraulic motors or jacks are disengaged or "set to freewheel" to enable the loading system to follow the movements of the target duct without constraining the coupling.

The two families of loading devices described above have structural differences, but their control systems are designed according to the same general principle of operation. It is noted that, in all cases, the coupling has at least three degrees of freedom relative to the base bearing the fixed end of the duct, and that the movements in each of these degrees of freedom are independently controlled by actuators. The operator has a command interface enabling him to control the movement of the coupling.

Each actuator is controlled either separately by an independent control of on/off type, or by a simultaneous proportional control.

In the case of on/off independent controls, the operator can act independently on each of the controls to control a particular member of the loading system. The combined action on the group of actuators enables the coupling to be positioned at a desired point in space.

In the case of proportional controls, the operator has a command input interface comprising a proportional control cooperating with a calculator such that acting on said proportional control with higher or lower magnitude leads to at least one proportional control instruction that is respectively of higher or lower magnitude for the corresponding actuators, resulting in a movement of the coupling at a speed of movement that is respectively higher or lower The operator may thus directly control the movement of the coupling, and may thus in particular achieve movement of the coupling that is rectilinear, and/or at constant speed, since the calculator composes the movement of the coupling by acting on all the actuators simultaneously.

In general, the actuators used are hydraulic, for example a hydraulic motor or jack, but the use of electric actuators is also known, for example electric motors, or pneumatic actuators. The actuators equipping marine loading systems are controlled either by on/off control, with a constant speed of movement, and in certain cases, with the possibility of setting two speeds of movement at will for the independent controls of on/off type, or by proportional distributors, in the case of proportional controls.

In all cases, the connection of the coupling to the target duct is made manually, the operator thus maneuvers the loading system, with or without the intermediary of a control calculator in order to come to connect the coupling on the target duct.

These control devices are difficult to implement, in that the operator must know the functioning and kinematics of the marine loading system perfectly Furthermore, he must compensate for the movements of the ship, in particular in the case of rough sea. This increases the risk of the coupling striking against obstacles or against the target duct, which may damage the seals of the coupling. The maneuvering and the connection thus require qualified personnel.

A system is known making it possible to facilitate the connection of a coupling to a target duct in which the coupling is linked in advance by a cable to the target duct. A cable is thrown between the quay or the ship bearing the base and the ship bearing the target duct, then attached by operators between the target duct and the base. A winch then enables the arm to be advanced along the tensioned cable and thus the coupling to be drawn towards the target duct. This system is commonly called a "targeting system". It is a semi-automatic system: once the cable has been connected, an operator must control the movement of the coupling along the cable by actuating the winding operation. A guiding cone is provided for the final phase of the approach. Once the coupling has been brought near, an operator must finalize its connection and its closure manually.

This mode of semi-automatic connection requires experienced staff and a suitable heavy mechanical structure (in particular a motor adapted to draw the arm along the cable, an anchorage point for the opposite end of the cable, and a guiding cone for the approach in the final phase).

On the basis of these observations, the invention aims to provide a device for facilitating the operation of controlling movement of the coupling for the operator, in particular to make it possible to succeed in connecting the coupling in unfavorable sea conditions, and more generally to facilitate the connection and make it more rapid in all cases, while reducing the risk of striking of the coupling.

SUMMARY OF THE INVENTION

To that end the invention provides a control device for the movement and positioning of a coupling for a marine loading system, said marine loading system comprising at least one fluid transfer line having a line end fixed to a base and a moveable line end provided with a coupling adapted for connection to a target duct, the coupling having at least three degrees of freedom relative to the base, the device being characterized in that it comprises at least three actuators, each for controlling the movement of the system in a corresponding degree of freedom, and at least one of the coupling and the target duct, or a member immediately neighboring the at least one of the coupling and the target duct, comprises at least one means for providing information on positioning of the coupling, and the device furthermore comprises calculating means adapted to:

calculate the relative positioning of the coupling directly relative to the target duct according to the information provided by the positioning information means of the coupling, calculate control instructions to give to each of the actuators such that their combined movements result in a movement of the coupling aimed at bringing the coupling closer to the target duct, apply said control instructions to bring the coupling closer to the target duct, reiterate the three preceding steps until the coupling is presented in front of the target duct in a position for connection.

Immediately neighboring members is understood to mean members of the marine loading system which are fixed or moveable relative to the coupling or the target duct respectively, but sufficiently close thereto whatever the geometric configuration of the loading system, to give precise information as to the relative positioning of the coupling relative to the target duct, in particular to make it possible to precisely present the coupling automatically in front of the target duct for the purpose of connection.

Advantageously, the device according to the invention enables the operator to dispense with controlling the movement of the coupling during the approach of the target duct for connection, since the device takes on the task of controlling the movement of the coupling automatically until the latter is presented in front of the target duct.

In other words, the device according to the invention enables the coupling to be automatically moved until it is located in front of the target duct in position for connection. The operator no longer needs to control the movement of the coupling for connection to the target duct, the movement of the coupling into position for connection is made automatically.

This advantageously makes it possible to facilitate the connection and make it faster in all cases and more particularly to succeed in making the connection of the coupling in unfavorable sea conditions, while reducing the risk of striking of the coupling.

With the device according to the invention, the connection is possible even for a novice operator.

The device according to the invention enables the safety of use to be increased by eliminating any risk of improper manipulation.

Advantageously, the invention adapts to any type of marine loading system, to the systems for transfer by rigid pipes as well as to the systems for transfer by flexible pipes, since the means for providing information on positioning of the coupling enable information to be obtained on the relative positioning of the coupling directly relative to the target duct independently of the kinematics and of the structure of the loading system.

According to advantageous features, which may be combined:

at least one of the coupling and the target duct, or a member that is fixed relative to the at least one of the coupling and the target duct, comprises at least one means for providing information on positioning of the target duct, and the calculating means are adapted to deduce on the basis of the information on positioning of the duct and of the information on positioning of the coupling provided by the at least two means for providing positioning information, the relative position of the coupling relative to the target duct;

the means for providing information on the positioning of the coupling and the means for providing information on the positioning of the target duct are designed to communicate with each other, and comprise calculating means for calculating and directly providing information on relative positioning of the coupling relative to the target duct.

the coupling is articulated at its end with three degrees of rotational freedom and at least one of the three rotations is controlled by an actuator, the device being provided with means for providing information on the angular orientation of the coupling and means for providing information on the angular orientation of the target duct, the calculating means being adapted to calculate, on the basis of the information provided by the means for providing information on the angular orientation, control instructions to give to the at least one actuator in order for the angular orientation of the coupling, in position for connection, to be substantially the same as the angular orientation of the target duct.

Advantageously, the coupling is orientated along the same axis as the target duct which enables a precise and reliable connection, while limiting the risk of collision and of deterioration of the seals.

In accordance with to advantageous features of the invention, which may be combined:

the device further comprises an actuator enabling the coupling to be clamped and unclamped, and, once the coupling has been presented in front of the target duct in a position for connection, the calculating means apply a control instruction to said actuator to clamp the coupling onto the target duct, once the coupling has been connected and clamped onto the target duct, the calculating means apply an instruction to disengage the actuators to control the movement of the system in its degrees of freedom, so as to make the movements of the system free.

Thus, advantageously, the connection is made without human intervention, even if the target duct moves, for example when the sea is rough. The clamping of the coupling is automatic once it has been presented in the position for connection. The actuators of the loading system are then allowed to be free in their movements to enable the coupling and the loading system to follow the movements of the target duct without damaging the loading system.

According to advantageous features, which may be combined:

the means for providing information on the positioning of the target duct includes a device of a system for global positioning in particular of GPS type, making it possible to give an absolute position of the target duct, the calculating means being adapted to calculate, on the basis of the information on absolute positioning of the target duct, the relative positioning of the coupling relative to the target duct;

the means for providing information on the positioning of the of the coupling includes a device of a system for global positioning, in particular of GPS type, making it possible to give an absolute position of the coupling, the calculating means being adapted to calculate, on the basis of the information on absolute positioning of the coupling and of the target duct, the relative positioning of the coupling relative to the target duct;

the devices for global positioning in particular of GPS type are devices designed to communicate with each other and comprise calculating means for calculating and providing directly information on relative positioning of the coupling relative to the target duct;

one of the means for providing information on positioning of the coupling or of the target duct includes an optical device, adapted to cooperate with the target duct or the coupling respectively or a target that is fixed relative to the target duct or relative to the coupling respectively, by emitting a luminous beam, such as a laser beam, towards the target duct or the coupling or a target that is fixed relative to the target duct or the coupling respectively, and to detect the reflected beam and to measure the travel time of the beam to deduce therefrom information on relative positioning of the coupling directly relative to the target duct.

the means for providing information on positioning of the coupling includes an optical camera, designed and mounted to provide an image of the coupling to the calculating means, the calculating means being adapted to process the image provided by the camera to calculate the relative positioning of the coupling relative to the target duct;

at least one cord is tensioned using a reel between the coupling and the target duct and the means for providing information on positioning are at least one angle sensor and/or at least one unwound cord length sensor on the reel, chosen so as to provide the calculating means with information making it possible to calculate the relative positioning of the coupling relative to the target duct;

at least one of the actuators for controlling the movement of the system in a degree of freedom is a proportional control actuator;

the device comprises a command interface for an operator, and the communication between the command interface and the calculating means is performed wirelessly, the command interface comprising a transmitter for wireless communication with a receiver linked to the calculating means, the device comprises at least two means for providing information on positioning of the coupling, one making it possible to determine the positioning of the coupling with greater precision than the other and the calculating means using, for the positioning of the coupling, the positioning means having greater precision when the distance between the coupling and the target duct becomes less than a predefined distance.

When the coupling is moved too far from the base, there is a risk of damage to the system, in particular by rupture or interference. When the coupling is moved too far from the base during extension there is a risk of rupture of the system. When the coupling is rotated relative to the base, in particular when several loading systems are disposed in parallel on a quay, there is a risk of collision with the neighboring loading systems: the term damage by interference is used.

To avoid such damage to the loading system, alarm devices have been provided on certain types of loading devices.

Systems are known using proximity detectors and angle sensors disposed on the members or on the path of members of the loading system. The systems for detecting proximity or switches have the drawback of requiring knowledge of the kinematics of the loading system and consequently to position switches or sensors on the system for defining working zones. Furthermore, these sensors only give a signal of on/off type, which limits the possibilities for alarms. There is a single zone limit per sensor. The devices with angle sensors enable working zones to be defined, but impose a system with a rigid structure for placing the sensors therein. Lastly, no systems are known at present enabling alarms to be triggered for the systems with flexible piping.

To that end, according to an advantageous feature of the present invention, the at least one means for providing information on positioning of the coupling is either adapted to cooperate directly with a means for providing information on positioning of the base disposed on the base or on a member that is fixed relative to the base to provide, on the basis of the information on positioning of the base, information on relative positioning of the coupling directly relative to the base, or adapted to provide information on absolute positioning of the coupling in space, and, the base having a fixed position in space, the device comprises a calculating means making it possible to calculate on the basis of the information on absolute positioning of the coupling and data on positioning of the base fixed in space, information on relative positioning of the coupling directly relative to the base, the device further comprises calculating means adapted to:

calculate, in real time, according to the movements of the coupling relative to the base, the information on positioning of the coupling relative to the base, data defining at least one positioning zone authorized for the coupling being parameterized in the calculating means, check, in real-time, whether the coupling is located within the authorized zone, emit a specific alarm when the coupling leaves the corresponding authorized zone to warn the operator.

Thus, authorized zones or working zones are defined virtually by the calculating means. It is not necessary to provide sensors or switches physically disposed on the loading system to define such zones and they are easy to parameterize via the calculating means.

This makes it possible to increase the safety of use by virtue of alarms triggered more precisely, independently of the kinematics and of the structure of the loading system.

Furthermore, it is possible to provide a plurality of authorized zones, for example overlapping one within the other, having different degrees of working risk, and corresponding to different alarms according to whether the work in the zone concerned bears a greater or lesser risk.

According to an advantageous feature, the calculating means are adapted to stop the application of the control instructions to give to each of the actuators for imparting movement to the coupling.

Thus, the connection procedure is automatically stopped when an alarm has been triggered, which enables the device according to the invention to be made safer.

According to an advantageous feature, several marine loading systems are connected to the calculating means, and a selector is provided at the command interface to selectively control one of the loading systems connected to the calculating means.

Thus the operator just has to select the arm of which he wishes to connect the coupling, and the operation will be performed automatically, whether the target duct is mobile or static.

According to another aspect, the invention provides a calculator for a device as described above that is adapted to:

calculate the relative positioning of the coupling relative to the target duct according to the information provided by the means for providing information on positioning of the coupling, calculate control instructions to give to each of the actuators such that their combined movements result in a movement of the coupling aimed at bringing the coupling closer to the target duct, apply said control instructions to bring the coupling closer to the target duct until it is presented in front of the target duct in a position for connection.

According to another aspect, the invention provides a method for the calculating means of a device as described above comprising the following calculating steps:

calculating the relative positioning of the coupling relative to the target duct according to the information provided by the means for providing information on positioning of the coupling, calculating control instructions to give to each of the actuators such that their combined movements result in a movement of the coupling aimed at bringing the coupling closer to the target duct, applying said control instructions to bring the coupling closer to the target duct until it is presented in front of the target duct in a position for connection.

The explanation of the invention will now be continued with the detailed description of an embodiment, given below by way of non-limiting example, with reference to the accompanying drawings.

DETAILED DESCRIPTION OF THE INVENTION

Figure 1:
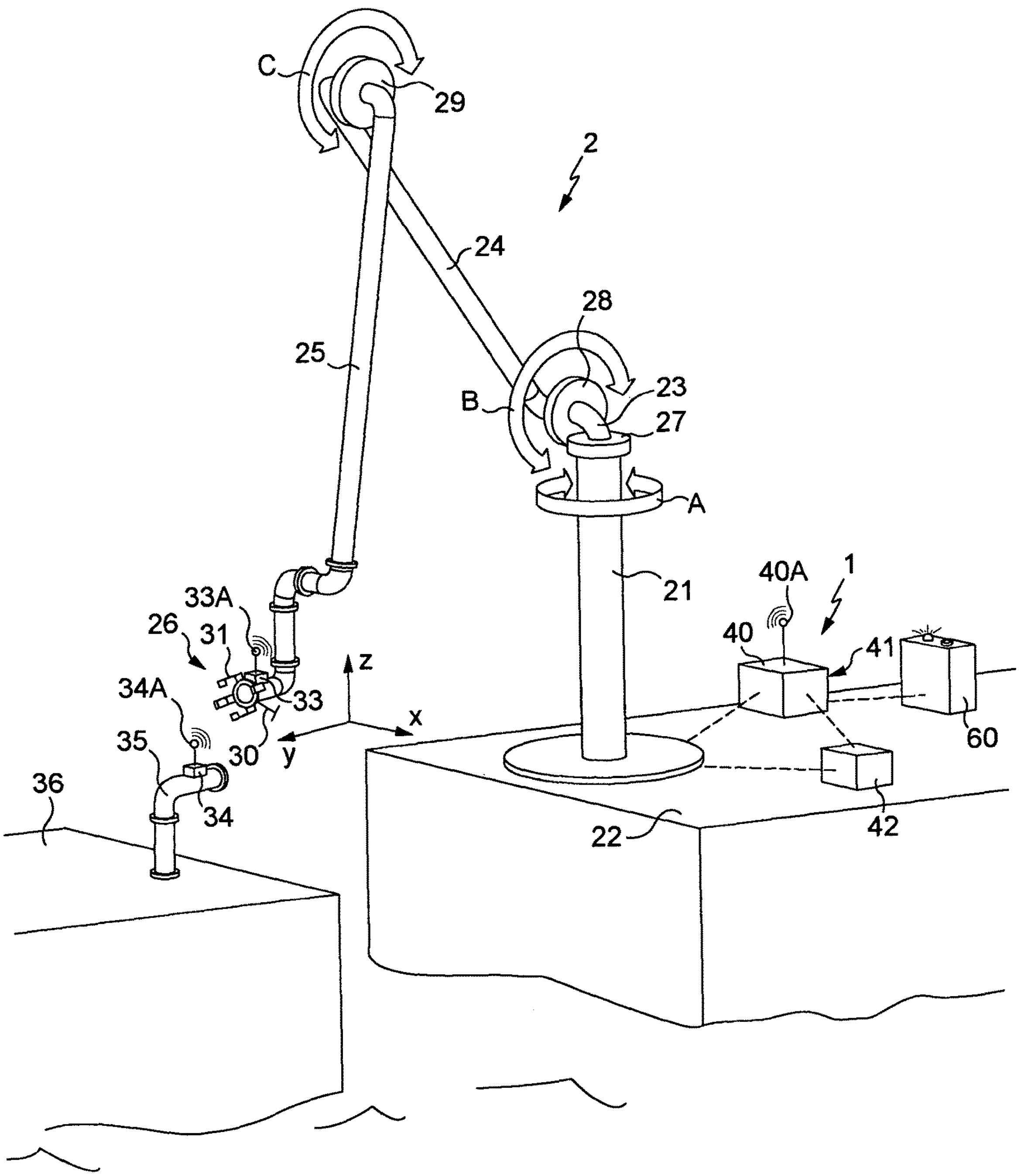
FIG. 1 is a diagrammatic view in perspective of a loading arm equipped with a control device according to the invention.

FIG. 1 is a very diagrammatic representation of a loading arm 2 equipped with a control device 1 according to the invention. The representation of the loading arm here is very simplified, and it should be recalled in this connection that the control device according to the invention adapts to any type of marine loading system, in particular to the loading systems described above.

The loading arm of FIG. 1 comprises a base 21 connected to a fluid tank which is located below the surface 22 on which the base is fixed. In the present case it is a quay, but in a variant it is a ship. At the apex of the base there is rotatably articulated a bent tube 23, on which is articulated in turn a first tube referred to as inner tube 24 which is articulated at its opposite end with a second tube referred to as outer tube 25. The end of the outer tube carries a coupling 26 adapted to be connected to a target duct 35, disposed in the present example on a ship 36 represented very diagrammatically.

In the embodiment represented, in a manner known per se, the coupling has three degrees of freedom in rotation relative to the end of the outer tube. In the present embodiment, these three rotations are free, such that an operator may freely adjust the angle of the coupling during the final phase of approach for the connection of the coupling to the target pipe.

In an alternative embodiment, not shown, one or more of these rotations are controlled by actuators and connected to a command interface to enable the operator directly to control the rotations on the final approach of the coupling.

In a manner known per se, the coupling in the present embodiment has locking claws 31 which are closed by an actuator 30 represented very diagrammatically to hold the coupling 26 around the target duct 35, once they are connected.

Generally, this type of loading arm is known per se, and will not be described in more detail here. It will moreover be recalled that the control device according to the invention adapts to all the marine loading systems, and that the adaptation of the control device according to the invention to any other type of loading system, in particular one of the systems described above, is within the capability of the person skilled in the art.

In the device according to the invention as represented diagrammatically in FIG. 1, actuators 27, 28, 29 are provided at each of the three articulations of the loading arm (symbolized by the double arrows A, B, C). More specifically, a first actuator 27 is provided between the apex of the base 21 and the bent tube 23, to pivot the latter horizontally relative to the base, a second actuator 28 is provided between the end of the bent tube 23 and the inner tube 24 so as to pivot the inner tube vertically, and a third actuator 29 is provided between the inner tube 24 and the outer tube 25 to make the latter pivot vertically.

The three actuators 27, 28, 29 are hydraulic jacks here represented very diagrammatically in FIG. 1. In a variant not illustrated, one or more of the hydraulic jacks are replaced by hydraulic motors. According to another variant not illustrated, the actuators are electric or pneumatic motors.

The target duct 35 provided here on a ship 36 represented very diagrammatically is provided with a box 34 enclosing a means for providing information on positioning of the target duct which is, in the present embodiment, a device of a system for global positioning of GPS type, enabling an absolute position to be given, and more particularly the spatial coordinates of the free end of the target duct.

The same applies for the coupling 26, which comprises a box 33 enclosing a device of a system for global positioning of GPS type, enabling an absolute position to be given, and more particularly the spatial coordinates of the connecting end of the coupling.

The calculating means of the control device are combined into a calculator 41 disposed in an electrical control cabinet 40.

A hydraulic power unit 42 is provided to supply the actuators with the hydraulic energy necessary for their operation. It is controlled by the calculator 41.

The GPS boxes 33 and 34 are each respectively provided with an emitting device 33A and 34A to emit a signal comprising positioning information. The calculator is linked to a receiver device 40A adapted to receive said signals from the emitters 33A and 34A. The control device furthermore comprises a command interface 60 for an operator.

Alternatively, the box 33 is positioned on a member immediately neighboring the coupling, for example one of the members articulated to the end of the arm, the calculating means being adapted to extrapolate the information on positioning of the coupling relative to the information provided by the box.

Figure 2:
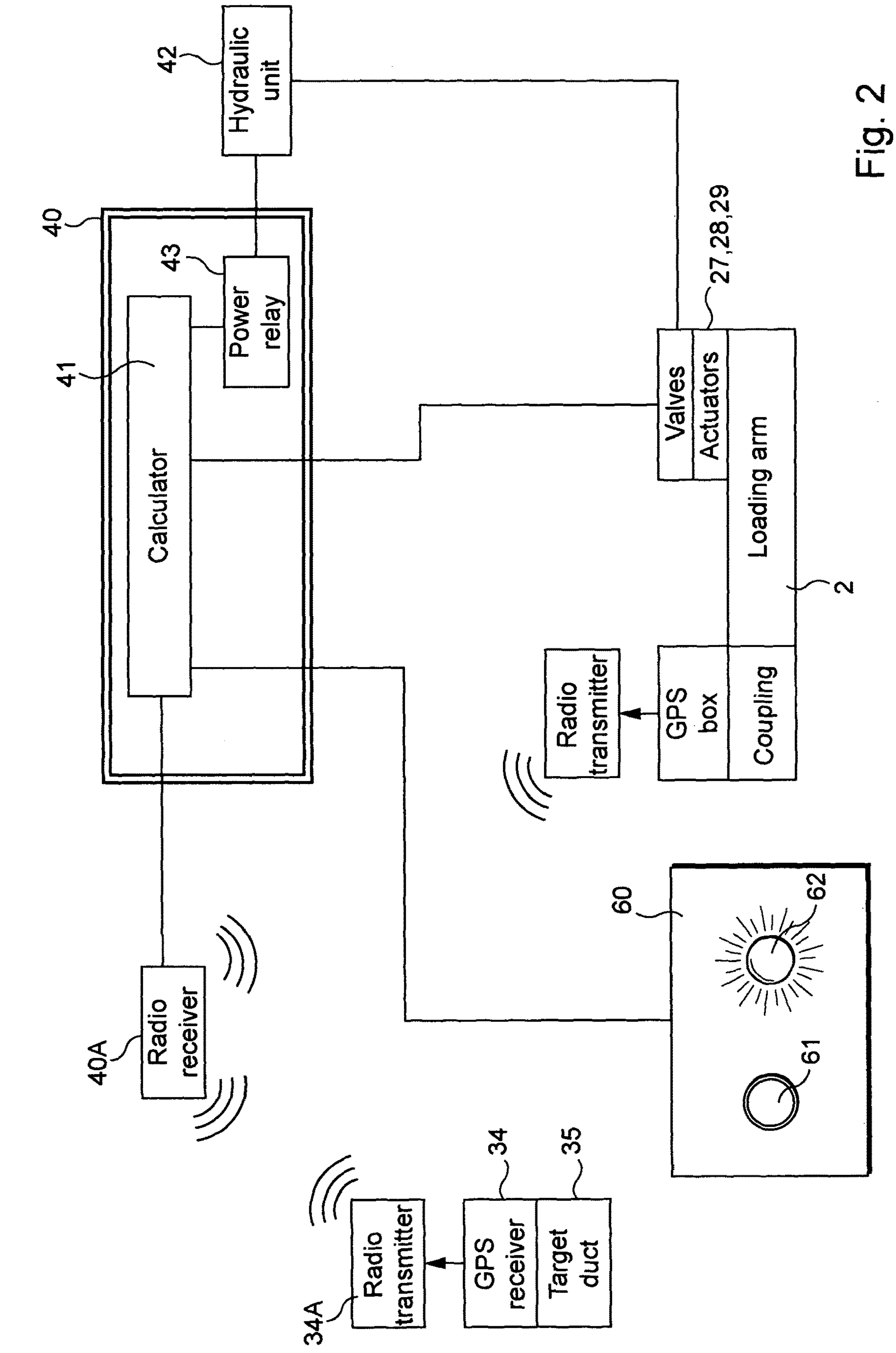
FIG. 2 is an synoptic diagram of the operation of the device according to FIG. 1.

As can be seen more particularly in FIG. 2, in the synoptic diagram of the operation of the device according to FIG. 1, the calculator 41 is linked to the receiver device 40A, which is a radio receiver, adapted to communicate with the radio transmitter devices 33A and 34A respectively linked to the GPS boxes 33 and 34 of the coupling and of the target duct. The GPS boxes thus provide the calculator with information on the positioning of the coupling and of the target duct.

In an alternative embodiment, the GPS boxes are devices designed to communicate with each other so as to directly provide information on the relative position of the coupling relative to the target duct, to the calculator.

The loading arm 2 is equipped with actuators 27, 28, 29, which are controlled by valves that are themselves controlled by the calculator. The hydraulic power unit 42 supplies the actuators via said valves with the hydraulic energy necessary for their operation. The hydraulic power unit 42 is controlled by the calculator via power relay 43 to control the starting and stopping of the hydraulic power unit. The hydraulic power unit comprises a pump (not represented) adapted to pump a hydraulic fluid to supply the actuators.

The command interface 60 is linked to the calculator to enable an operator to command the connection of the coupling to the target duct.

Figure 3:
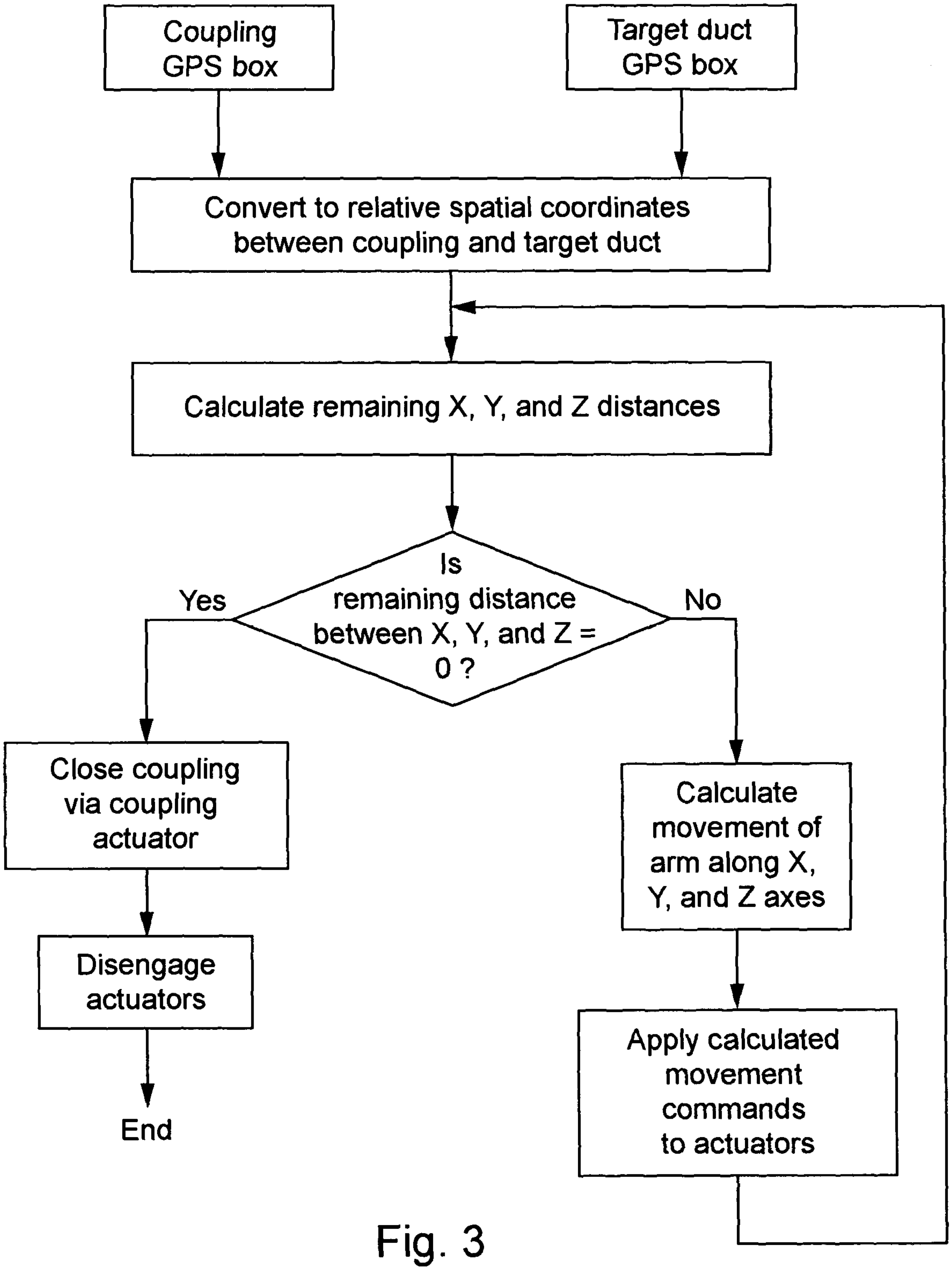
FIG. 3 is a function diagram to represent the principle of operation of the control device according to FIGS. 1 and 2.

As can be seen in FIGS. 2 and 3, when the operator wishes to connect the coupling to the target duct, he actuates a button 61 on the command interface 60 to order the connection. A signal corresponding to his order is then sent to the calculator. The calculator then launches the automatic connection procedure.

The calculator receives, via the radio receiver 40A, the information on positioning of the coupling and of the target duct from the respective GPS boxes 33 and 34. Alternatively, in another embodiment, the calculator receives the information by cable directly from the GPS boxes.

According to an alternative embodiment, the GPS box 34 situated on the ship sends the information on positioning of the target duct to the GPS box 33 of the loading arm which calculates the relative positioning of the coupling relative to the target duct and sends back the result to the calculator by radio or wire link.

The calculator converts this information into spatial coordinates to obtain the relative position of the coupling relative to the target duct.

On the basis of the information on the relative position of the coupling relative to the target duct, the calculator calculates the distances that remain between the coupling and the target duct along the X, Y and Z axes, diagrammatically represented in FIG. 1.

If these three distances are not zero, or equal to distances parameterized as reference distances that are known for the connection, the calculator calculates control instructions for each of the actuators 27, 28, 29 of the arm such that their combined movements result in a movement of the coupling aimed at bringing the coupling closer to the target duct along the three axes. The calculator then applies the control instructions calculated for each actuator to the actuators 27, 28, 29 via the corresponding valves. Once the instructions have been executed by the actuators, the calculator again calculates the distances remaining between the coupling and the target duct along the X, Y and Z axes. If these distances are still not zero or equal to the parameterized distances (for example, when the sea conditions are bad) the calculator recommences the calculations of the instructions for the actuators and applies them until the distances are zero or equal to the parameterized distances. In other words, the calculator applies control instructions, at the order of the operator via the command interface 60, to bring the coupling towards the target duct until it is presented in front of the target duct in a position for connection.

If the three distances are zero or equal to the parameterized distances, it means that the coupling is located facing the target duct in position for connection. The calculator then sends a control instruction to the actuator 30 of the coupling to clamp the coupling to the target duct, and then an instruction to disengage the actuators 27, 28, 29 of the arm, so as to make the movements of the arm free once the coupling has been connected and clamped to the target duct.

Lastly, an indicator light 62 indicates to the operator on the command interface that the automatic connection has ended successfully.

An emergency stop button for stopping the automatic connection procedure, not shown, is provided on the command interface 60.

In a variant, not shown, other indicators are provided on the command interface to signal to the operator various malfunctions or problems in the automatic connection process.

According to an embodiment not represented, the means for providing information on positioning of the coupling is adapted to cooperate directly with a means for providing information on positioning of the base disposed on the base or on a member that is fixed relative thereto to provide, on the basis of the information on positioning of the base, information on relative positioning of the coupling directly relative to the base. This may, for example, be the same GPS box 33 cooperating with another GPS box disposed on the base. Alternatively, if the base is fixed to a quay, the means for providing information on positioning of the coupling is adapted to provide information on absolute positioning of the coupling in space for example via a GPS box and, with the base having a position fixed in space, the calculator is adapted to calculate, on the basis of the GPS coordinates of the fixed base and the GPS coordinates of the coupling mobile in space, the relative positioning of the coupling directly relative to the base. In this embodiment, the calculator calculates in real time information on positioning of the coupling relative to the base according to the movements of the coupling and the information provided by the means for providing information on positioning of the coupling. The calculator is parameterized with data defining at least one authorized zone for positioning of the coupling and is adapted to verify in real time whether the coupling is in the authorized zone. In the opposite case, the calculator is adapted to emit an alarm when the coupling leaves the corresponding authorized zone. Advantageously, according to a variant, the calculating means are adapted to stop the command for automatic connection of the coupling when such an alarm is emitted. Advantageously, the fact of providing such authorized zones or working zones makes it possible to avoid a risk of damage to the system in particular by rupture or interference when the coupling is moved too far from the base during extension or rotation.

In this case, the calculator is programmable so as to define working zones and/or forbidden zones which may be parameterized by the operator according to each loading or unloading operation of fluid products. This makes it possible, for example, to adapt the automatic connection procedure to different ships which may have different possible collisions zones.

Light or sound emitting indicators are provided to warn the operator of the crossing of an authorized zone boundary.

In an embodiment that is not represented, several marine loading systems are connected to the same calculator 40, and a selector is provided at the command interface to selectively control the connection of one or other of the loading systems linked to the calculator. Working zones corresponding to the neighboring loading system are programmed so as to avoid collisions between the different loading systems.

In an alternative embodiment not represented, the three degrees of rotational freedom of the coupling at its end relative to the end of the outer tube are controlled by actuators, for example hydraulic motors or jacks. The device is provided with means for providing information on angular orientation of the coupling, and means for providing information on angular orientation of the target duct, for example pendulum sensors. Suitable calculating means are provided to calculate, according to the information provided by the means for providing information on angular orientation of the coupling and of the target duct, control instructions given to the actuators in order for the angular orientation of the coupling, in position for connection, to be substantially the same as the angular orientation of the target duct. Thus, the connection is made more precise and more reliable in that, on connection, the target duct and the coupling are aligned. This makes it possible in particular to reduce the risks of damage to the seals between the coupling and the target duct.

In all cases, when the connection has been made, that is to say when the coupling has been clamped onto the target duct, the calculator sends a disengage instruction to the actuators so as to make the movements of the system free in order to enable the coupling to freely follow the movements of the target duct.

Figure 4:
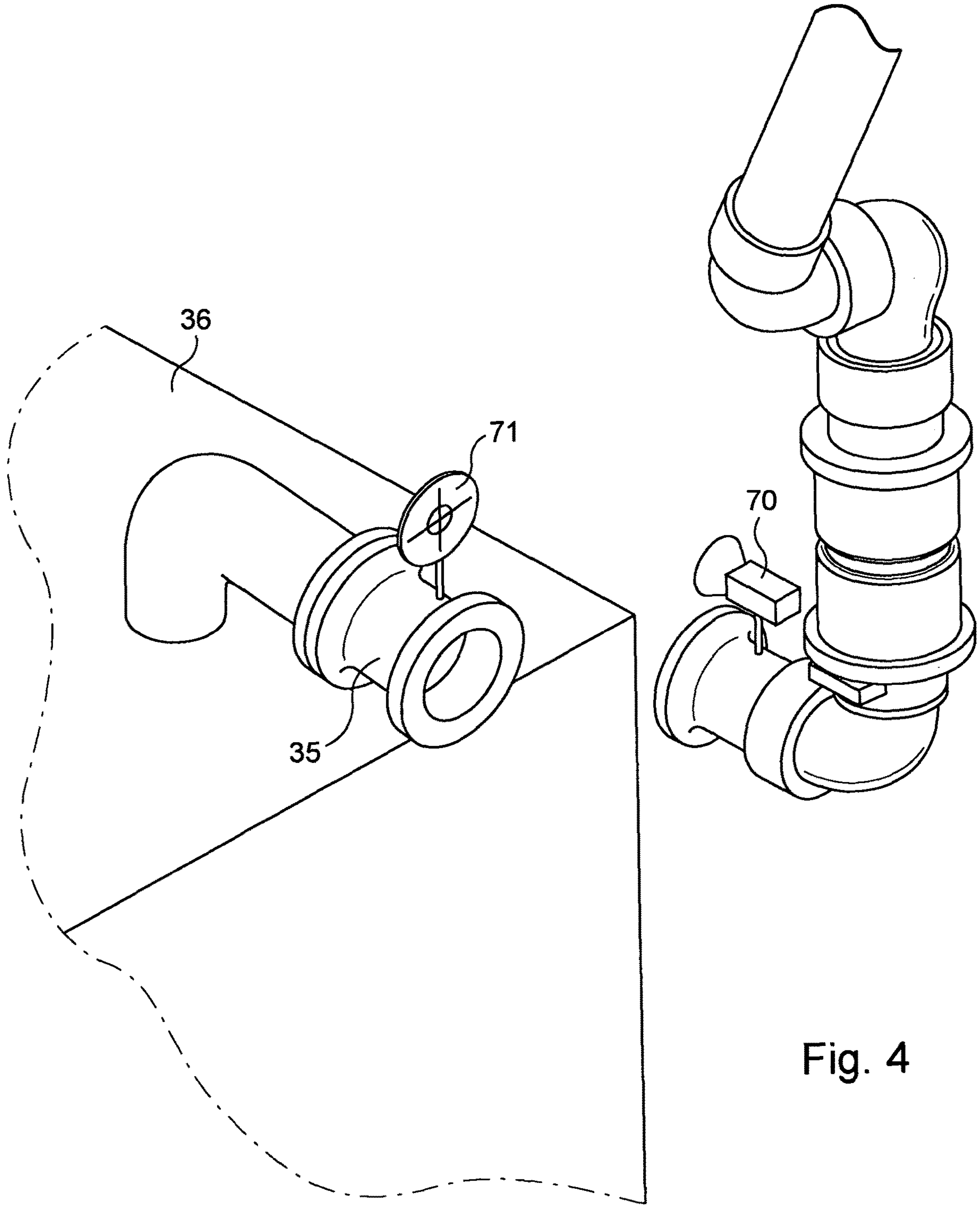
FIG. 4 is a diagrammatic view in perspective of another embodiment of a loading arm equipped with a control device according to the invention.

FIG. 4 is a diagrammatic view in perspective of another embodiment of a loading arm equipped with a control device according to the invention, in which the means for providing information on positioning of the coupling is a camera mounted on the coupling. The representation of the coupling has been simplified for reasons of clarity.

A target 71 is disposed on the target duct 35. The camera is designed to focus on the target and provide the calculator with an image of the target. On the basis of that image, the calculator is adapted to calculate the relative positioning of the coupling relative to the target duct.

To that end, the calculator is provided with an algorithm for processing the image and for shape recognition in order to determine the distance and the angle so as to deduce therefrom the relative positioning of the coupling relative to the target duct. For the calculation of the distance, the algorithm uses the principle whereby the greater the distance between the coupling and the target duct, the smaller the image of the target, and for the calculation of the angle, the principle whereby, for a circular target, when the coupling is along the axis of the target duct, the image of the target is circular, and when the coupling is axially offset relative to the target duct, the image of the target is elliptical.

In another variant, several cameras are disposed to focus on the same target and provide several images to the calculator, the latter being adapted to process all these images to calculate the relative positioning of the coupling relative to the target duct.

In another embodiment, a camera is mounted on a motorized support, itself controlled by calculating means to pivot in order to be continuously oriented towards the target and enabling the angular orientation of the camera relative to the axis of the coupling to be known at any time, the calculating means being adapted to process this angular orientation information and the image sent by the camera to control the movement of the coupling to a position for connection.

Preferably, for reasons of performance, the target is a reflective sighting device.

According to an advantageous variant not illustrated, the target may be omitted, and the camera designed so as to take the free end of the target duct itself as a target. This embodiment makes it possible in particular to dispense with having a sighting device or target on the target duct. Thus, for example, if the target duct is on a boat, it will be possible for the device to adapt to all boats of which the ducts are compatible with the coupling, whether they are equipped with a target or not.

Apart from the differences described above, structurally, and functionally, this embodiment is the same as the embodiment of FIGS. 1 to 3, and it will not therefore be described in more detail here.

According to another embodiment not illustrated, the camera may be disposed on the target duct or on the bridge of a boat so as to be fixed or motorized relative to the bridge of the boat and be oriented to provide the calculator with an image of the coupling, so as to enable the calculator to calculate using the same principle the relative positioning of the coupling relative to the target duct.

Figure 5:
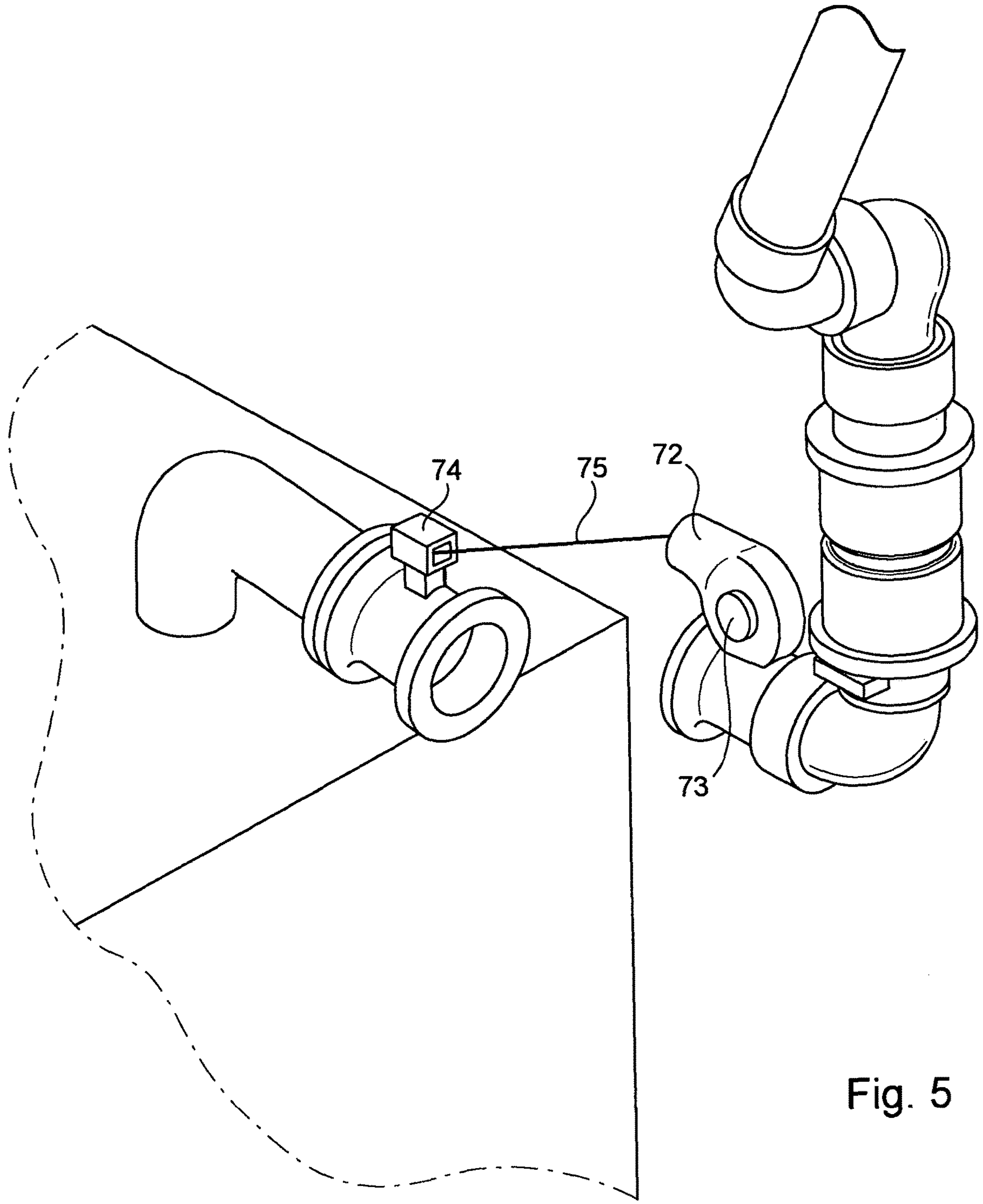
FIG. 5 is a diagrammatic view in perspective of another embodiment of a loading arm equipped with a control device according to the invention.

FIG. 5 is a diagrammatic view in perspective of another embodiment of a loading arm equipped with a control device according to the invention, in which the means for providing information on positioning of the coupling is a tensioned cord between the target duct and the coupling.

At one of its ends, the cord 75 has means for fastening to the target duct. The other end of the cord is attached to the drum of a reel 72, itself mounted on the coupling. The reel comprises an incremental sensor 73 making it possible to determine the length of cord unwound, this information being sent to the calculator which deduces therefrom the distance between the coupling and the target duct.

Furthermore, an angle sensor 74 of the cord is provided for the cord 75, in order to determine an inclination of the cord relative to at least two reference angles.

In this way, it is possible to determine the relative positioning of the coupling relative to the target duct on the basis of the two reference angles and the distance of the unwound cord. The angle sensor is for example a sensor using an inclinometer or a laser to determine the inclination of the cord relative to said at least two reference angles.

As a variant, the device is provided with a plurality of reels of which the cords are attached at separate places, such that on the basis solely of the information on the unwound distances provided by the reel sensors, the calculator calculates the angles and the distance for the relative positioning of the coupling relative to the target duct.

On putting it in place, the cord is first of all fastened to a projectile which is thrown by means known to the person skilled in the art from the quay to the ship, or from the ship to another ship. An operator then fastens the free end of the cord to a place provided on the target duct. The operator may then launch the procedure for automatic connection using the same principle as in the embodiment of FIGS. 1 to 3.

According to a variant not illustrated, the reel is provided with a cord rupture detector to suspend the connection procedure in case of rupture of the cord and to trigger a procedure for retraction of the arm. A corresponding warning is then communicated to the operator via the command interface, for example by an indicator light indicating the breakage of the cord.

Figure 6A:
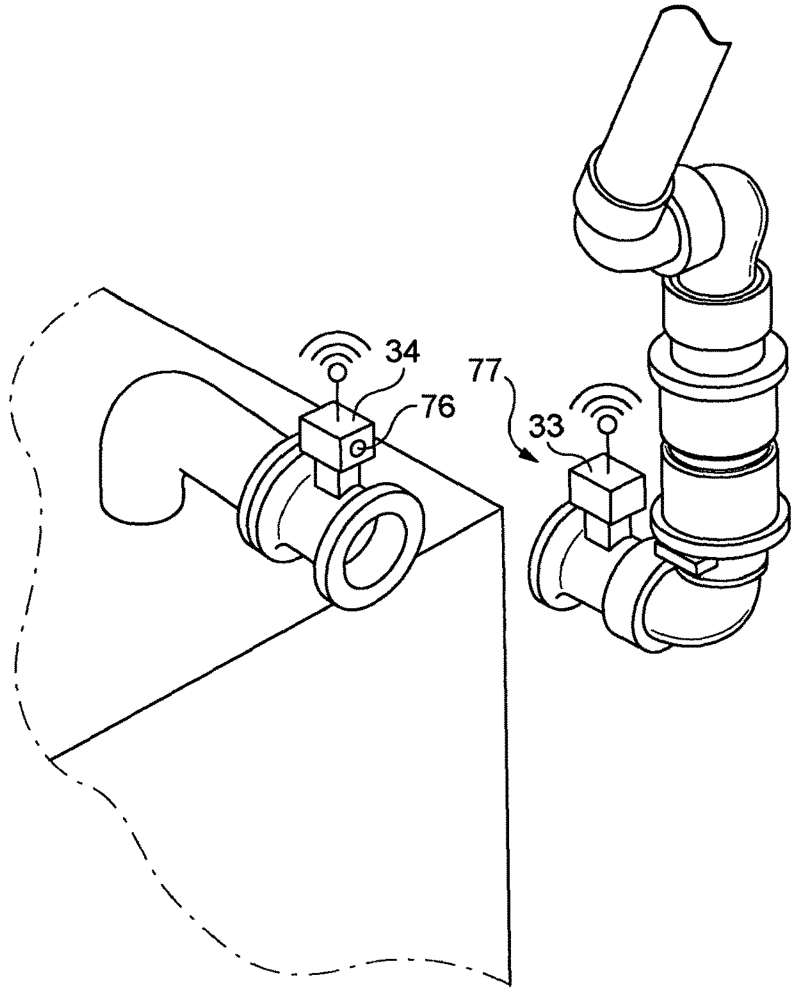
FIGS. 6A and 6B are diagrammatic views in perspective of yet another embodiment of a loading arm equipped with a control device according to the invention.
Figure 6B:
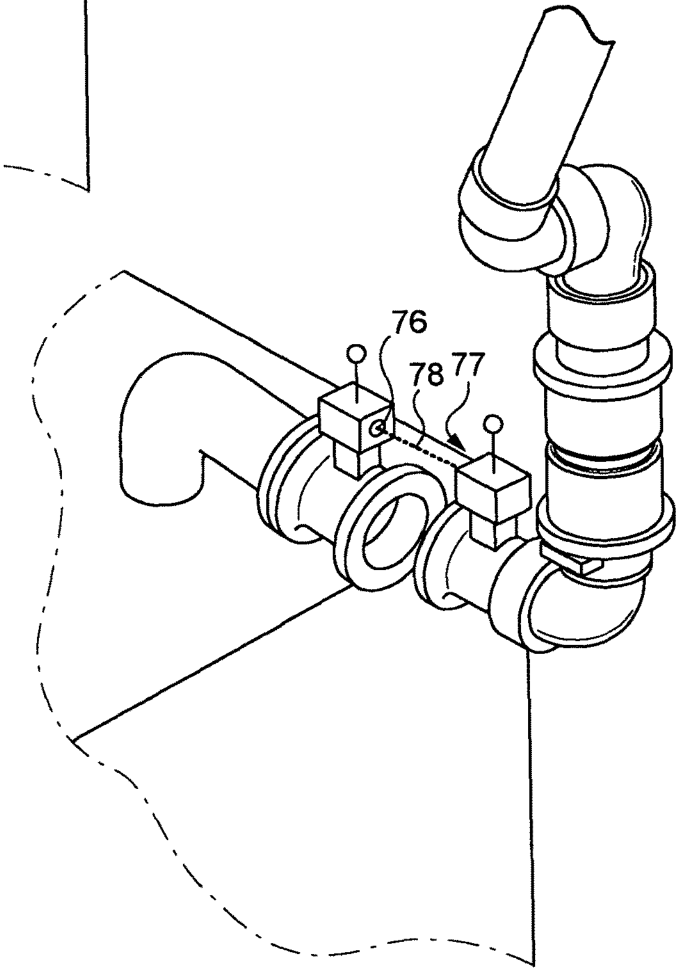

FIGS. 6*a* and 6*b* are diagrammatic views in perspective of another embodiment of the loading arm equipped with a control device according to the invention, in which two different means of providing information on positioning of the coupling are used. One of the means makes it possible to determine the positioning of the coupling with greater precision than the other. The calculator 40 is adapted to use the means for positioning of the coupling having the least precision to perform a rough approach for the purpose of the connection of the coupling to the target duct and then, when the distance between the coupling and the target duct becomes less than a predefined distance, the calculator uses the coupling positioning information means having the greatest precision to perform the final phase of the approach for the purpose of presenting the coupling in front of the target duct in a position for connection. In practice, in a first phase the calculator uses positioning information from the GPS boxes 33 and 34 according to the same principle as described earlier, and in a second phase the calculator uses positioning information from a laser device comprising a laser emitter 77 and a target 76, the device being adapted to determine, by virtue of a laser beam 78, the relative to positioning of the coupling relative to the target duct during the final phase of the approach aiming to present the coupling in front of the target duct in a position for connection. Thus, advantageously, the device takes advantage of the features of the different means for providing information on positioning of the coupling and of the target duct by matching their degrees of precision with the distance remaining to reach a position for connection. The precision of the connection is optimized thereby. As a variant, the laser device is replaced by an infra-red device.

Generally, in a variant that is not illustrated which applies to all the embodiments described above, several arms are controlled by the same calculator. A selector provided on the command interface enables a plurality of loading arms, linked to the same calculator, to be controlled using the same principle and with the same command interface.

In another general variant that is not illustrated, the command interface is a remote control unit provided with a transmitter for wireless communication with a receiver linked to the calculator in the electrical control cabinet. The transmitter and receiver communicate by radio waves. As a variant, the transmitter and the receiver communicate by optical waves, for example infrared waves.

In a variant not illustrated, at least one of the actuators of the loading arm is a proportional control actuator. In this variant, the calculator is adapted to control the proportional control actuators. Advantageously, the use of a proportional control actuator makes it possible to have movement of the coupling that is direct and rectilinear, and thus shorter and faster. This enables the time for the automatic connection procedure to be reduced.

Numerous other variants are possible according to circumstances, and in this connection it is to be noted that that the invention is not limited to the examples represented and described.

The invention claimed is:

1. A control device for controlling movement and positioning of a coupling which is located on a movable first end of a fluid transfer line of a marine loading system and is adapted for connection to a target duct, a second end of the fluid transfer line being fixed to a base and the coupling having at least three degrees of freedom relative to the base, the device comprising:

at least three actuators, each of which controls movement of the coupling in a corresponding degree of freedom;

a first global positioning system (GPS) device positioned on or adjacent one of the coupling and the target duct for providing information on the absolute positioning of said one of the coupling and the target duct in space; and calculating means for (a) calculating the positioning of the coupling relative to the target duct from the information on the absolute positioning of said one of the coupling and the target duct in space and information on the absolute positioning of the other of the coupling and the target duct in space, (b) calculating control instructions for each of the actuators which will result in movement of the coupling toward the target duct, (c) applying said control instructions to the actuators to bring the coupling toward the target duct, and (d) repeating steps (a)-(c) as necessary until the coupling is located in a position for connection to the target duct;

wherein the first GPS device is positioned on or adjacent the coupling for providing information on the absolute positioning of the coupling in space, and wherein the device further comprises second means for providing information on the positioning of the coupling relative to the target duct, said second means being adapted to determine the positioning of the coupling with greater precision than the first GPS device, wherein the calculating means uses the information on the positioning of the coupling from the second means when the distance between the coupling and the target duct is less than a predefined distance.

2. A device according to claim 1, wherein the coupling is articulated with three degrees of rotational freedom relative to the movable first end of the fluid transfer line and the device further comprises:

at least one additional actuator for controlling movement of the coupling in at least one of the three rotational degrees of freedom;

means for providing information on the angular orientation of the coupling; and means for providing information on the angular orientation of the target duct;

wherein the calculating means is adapted to calculate, from the information on the angular orientation of the coupling and on the angular orientation of the target duct, control instructions for the at least one additional actuator in order to make the angular orientation of the coupling in the position for connection substantially equal to the angular orientation of the target duct.

3. A device according to claim 1, further comprising an clamping actuator for enabling the coupling to be clamped and unclamped, wherein once the coupling is in the position for connection, the calculating means applies a control instruction to said clamping actuator to clamp the coupling onto the target duct.

4. A device according to claim 3, wherein once the coupling has been clamped onto the target duct, the calculating means applies an instruction to disengage the actuators.

5. A device according to claim 1, further comprising a second GPS device positioned on or adjacent the target duct for providing said information on the absolute positioning of the target duct in space.

6. A device according to claim 5, wherein the first and second GPS devices comprise means for communicating with each other and a calculator for calculating and providing information on the positioning of the coupling relative to the target duct.

7. A device according to claim 1, wherein at least one of the actuators comprises a proportional control actuator.

8. A device according to claim 1, further comprising a command interface for an operator, wherein communication between the command interface and the calculating means is performed wirelessly.

9. A device according to claim 1, further comprising means positioned on or adjacent the base for providing information on the absolute positioning of the base in space, wherein the calculating means is adapted to calculate in real time from the information on the positioning of the coupling and the information on the positioning of the base, information on the positioning of the coupling relative to the base, compare the information on the positioning of the coupling relative to the base to data defining at least one authorized positioning zone for the coupling, and trigger a perceptible alarm signal when the coupling leaves the authorized positioning zone.

10. A device according to claim 9, wherein the calculating means is adapted to stop the application of the control instructions to the actuators when the coupling leaves the authorized positioning zone.

11. A device according to claim 1, wherein several marine loading systems are connected to the calculating means and a selector is provided at a command interface to selectively control one of the loading systems connected to the calculating means.

12. A control device for controlling movement and positioning of a coupling which is located on a movable first end of a fluid transfer line of a marine loading system and is adapted for connection to a target duct, a second end of the fluid transfer line being fixed to a base and the coupling having at least three degrees of freedom relative to the base, the device comprising:

at least three actuators, each of which controls movement of the coupling in a corresponding degree of freedom;

means positioned on or adjacent at least one of the coupling and the target duct for providing information on the positioning of the coupling relative to the target duct; and calculating means for (a) calculating the positioning of the coupling relative to the target duct from the information on the positioning of the coupling relative to the target duct, (b) calculating control instructions for each of the actuators which will result in movement of the coupling toward the target duct, (c) applying said control instructions to the actuators to bring the coupling toward the target duct, and (d) repeating steps (a)-(c) as necessary until the coupling is located in a position for connection to the target duct;

wherein the means for providing information on the positioning of the coupling relative to the target duct comprises a cord which is tensioned between the coupling and the target duct using a reel, and at least one of a cord angle sensor and an unwound cord length sensor.

13. A method for controlling positioning of a coupling which is located on a movable end of a fluid transfer line of a marine loading system and is adapted for connection to a target duct, the marine loading system comprising at least three actuators which each control movement of the coupling in a corresponding degree of freedom, the method comprising the steps of:

determining the absolute positioning of the coupling in space;

determining the absolute positioning of the target duct in space;

calculating the positioning of the coupling relative to the target duct from the absolute positioning of the coupling and the target duct;

calculating control instructions for each of the actuators which will result in a movement of the coupling toward the target duct; and applying said control instructions to the actuators to bring the coupling into a position for connection to the target duct.

* * * * *